US010705748B2

(12) United States Patent
Jiao

(10) Patent No.: US 10,705,748 B2
(45) Date of Patent: Jul. 7, 2020

(54) METHOD AND DEVICE FOR FILE NAME IDENTIFICATION AND FILE CLEANING

(71) Applicant: Beijing Kingsoft Internet Security Software Co., Ltd., Beijing (CN)

(72) Inventor: Guoqiang Jiao, Beijing (CN)

( * ) Notice: Subject to any disclaimer, the term of this patent is extended or adjusted under 35 U.S.C. 154(b) by 285 days.

(21) Appl. No.: 15/736,125

(22) PCT Filed: Aug. 12, 2016

(86) PCT No.: PCT/CN2016/094954
§ 371 (c)(1),
(2) Date: Dec. 13, 2017

(87) PCT Pub. No.: WO2016/202308
PCT Pub. Date: Dec. 22, 2016

(65) Prior Publication Data
US 2018/0173450 A1    Jun. 21, 2018

(30) Foreign Application Priority Data
Jun. 15, 2015    (CN) .......................... 2015 1 0329296

(51) Int. Cl.
*G06F 12/00*       (2006.01)
*G06F 16/00*       (2019.01)
(Continued)

(52) U.S. Cl.
CPC ............ *G06F 3/0643* (2013.01); *G06F 16/16* (2019.01); *G06F 16/162* (2019.01); *G06F 40/10* (2020.01); *G06F 40/284* (2020.01)

(58) Field of Classification Search
None
See application file for complete search history.

(56) References Cited

U.S. PATENT DOCUMENTS

2006/0136194 A1* 6/2006 Armstrong ............ G06F 16/367
704/4
2010/0070288 A1* 3/2010 Pandey .................. G06Q 30/02
705/14.72
(Continued)

FOREIGN PATENT DOCUMENTS

CN         101569129         10/2009
CN         102214142         10/2011
(Continued)

OTHER PUBLICATIONS

Office Action issued in Chinese Application No. 201510329296.6, dated Nov. 3, 2017.

*Primary Examiner* — Tuan A Pham
(74) *Attorney, Agent, or Firm* — Norton Rose Fulbright US LLP

(57) ABSTRACT

Embodiments of the present application disclose a method and a device for file name identification and file cleaning. The method for file name identification comprises: determining a set of files to be processed; obtaining a string corresponding to the name of each file included in the set of files to be processed; for the obtained string corresponding to the name of each file, detecting whether a regular expression template matching the string is present in a preset regular expression template library; determining the detected regular expression template as a regular expression template of the file name corresponding to the string; identifying a regular expression of the file name corresponding to the string according to the determined regular expression template. Embodiments of the present application are applied to enable automatic identification of file names and the cleaning of files in electronic devices, improving the efficiency of identifying file names in electronic devices and the efficiency of file cleaning.

10 Claims, 6 Drawing Sheets

(51) Int. Cl.
*G06F 3/06* (2006.01)
*G06F 16/16* (2019.01)
*G06F 40/10* (2020.01)
*G06F 40/284* (2020.01)

(56) References Cited

U.S. PATENT DOCUMENTS

| | | | | |
|---|---|---|---|---|
| 2013/0091168 A1* | 4/2013 | Bhave | ............... | G06F 16/2477 |
| | | | | 707/771 |
| 2013/0110585 A1* | 5/2013 | Nesbitt | ............... | G06Q 30/02 |
| | | | | 705/7.35 |
| 2014/0075416 A1* | 3/2014 | Waldon | ............... | G06F 11/3664 |
| | | | | 717/125 |

FOREIGN PATENT DOCUMENTS

| | | |
|---|---|---|
| CN | 102880713 | 1/2013 |
| CN | 103793462 | 5/2014 |
| CN | 104182531 | 12/2014 |
| CN | 104881495 | 9/2015 |
| CN | 104881496 | 9/2015 |

\* cited by examiner

METHOD AND DEVICE FOR FILE NAME IDENTIFICATION AND FILE CLEANING

CROSS-REFERENCE TO RELATED APPLICATIONS

This application is a national phase under 35 U.S.C. § 371 of International Application No. PCT/CN2016/094954, filed Aug. 12, 2016, which claims priority to Chinese Patent Application No. 201510329296.6, and entitled "Method and Device for File Name Identification and File Cleaning", filed Jun. 15, 2015. The contents of each of the above-referenced applications are incorporated into the present application by reference.

The present application claims the priority to a Chinese Patent Application No. 201510329296.6, filed with State Intellectual Property Office of People's Republic of China on Jun. 15, 2015 and entitled "Method and Device for File Name Identification and File Cleaning", which is incorporated herein by reference in its entirety.

TECHNICAL FIELD

The present application relates to the technical field of file name identification, and particularly to a method and a device for file name identification and file cleaning.

BACKGROUND

With the development of smart phones and mobile phone software, more and more folders are generated by mobile phones, and also more and more files are stored in mobile phones. Normally, users will clean up junk files and retrieve files and folders in mobile phones. In order to improve the cleanup efficiency of junk files and the retrieval efficiency of folders, etc., it is usually necessary to identify regular expressions corresponding to the names of the files in the electronic device.

A regular expression, also known as formal representation, conventional representation, is a concept in computer science. The regular expression uses a single string to describe, match a series of strings that conform to a certain syntax rule. In practical applications, a user can determine, according to a given regular expression and a string, whether the given string conforms to the filter logic of the regular expression; it is also possible to obtain a user-desired specific part from a given string by a given regular expression.

At present, a regular expression corresponding to the name of a file in an electronic device is mainly identified manually, and the specific process is as follows: manually judging the name of each file in the electronic device, judging whether there is a regular expression template that matches this file name in a preset regular expression template library; if so, manually identifying the regular expression corresponding to the file name based on the matched regular expression template. For example, when the file name whose regular expression needs to be determined is "3548795", first manually determine a regular expression template that matches the file name in the preset regular expression template library, assuming that the matched regular expression template is [0-9] {s %}, and s % represents the length of the string; and further manually identify the regular expression "[0-9] {7}" corresponding to the file name "3548795".

However, when there are more files and thus more file names in an electronic device, identifying the file names in the electronic device using the above manual methods takes more time, and the efficiency is low.

SUMMARY

An object of embodiments of the present application is to provide a method and a device for file name identification, so as to enable automatic identification of file names in electronic devices and improve the efficiency of identifying file names in electronic devices.

Another object of embodiments of the present application is to provide a method and a device for file cleaning, so as to enable automatic identification and file cleaning of file names in electronic devices and improve the efficiency of identifying file names in electronic devices and the efficiency of file cleaning.

In order to achieve the above objects, embodiments of the present application disclose a method for file name identification, applicable to an electronic device, which comprises:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template.

Optionally, determining a set of files to be processed comprises:

determining all the files in each folder in the electronic device as a set of files to be processed.

Optionally, determining a set of files to be processed comprises:

detecting whether the name of each folder in the electronic device conforms to a preset first string matching rule respectively;

determining, as a set of files to be processed, all the files in the folder corresponding to the detected folder name that conforms to the first string matching rule.

Optionally, determining a set of files to be processed comprises:

detecting whether the name of each folder in the electronic device conforms to a preset second string matching rule respectively;

determining, as a set of files to be processed, all the files in the folders corresponding to all the detected folder names that conform to the second string matching rule.

Optionally, determining a set of files to be processed comprises:

judging whether the number of files in each folder in the electronic device is greater than or equal to a preset first threshold respectively;

if so, determining all the files in that folder as a set of files to be processed.

Optionally, before performing a regular expression identification operation on the obtained string corresponding to the name of each file respectively, the method further comprises:

determining the number N of types of regular expression templates in the regular expression template library that match strings corresponding to the names of files in the set of files to be processed;

performing a regular expression identification operation on the obtained string corresponding to the name of each file respectively, comprises:

when N is less than or equal to a preset second threshold, performing a regular expression identification operation on the obtained string corresponding to the name of each file respectively.

Optionally, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

Optionally, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

In order to achieve the above objects, embodiments of the present application disclose a method for file cleaning, applicable to an electronic device, the method comprises:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template;

matching the identified regular expression with a regular expression in a preset regular expression library for file cleaning;

deleting the file corresponding to the matched regular expression.

In order to achieve the above objects, embodiments of the present application disclose a device for file name identification, applicable to an electronic device, the device comprises: a first set determining module, a first string obtaining module, a first detecting module, a first template determining module and a first regular expression identifying module, wherein, the first set determining module is used for determining a set of files to be processed which includes at least one file;

the first string obtaining module is used for obtaining a string corresponding to the name of each file included in the set of files to be processed determined by the first set determining module;

the first detecting module is used for detecting whether a regular expression template matching the string is present in a preset regular expression template library for the string corresponding to the name of each file obtained by the first string obtaining module which includes at least one regular expression template;

the first template determining module is used for determining the regular expression template detected by the first detecting module as a regular expression template of the file name corresponding to the string;

the first regular expression identifying module is used for identifying a regular expression of the file name corresponding to the string according to the regular expression template determined by the first template determining module.

Optionally, the first set determining module is specifically used for:

determining all the files in each folder in the electronic device as a set of files to be processed.

Optionally, the first set determining module is specifically used for:

detecting whether the name of each folder in the electronic device conforms to a preset first string matching rule respectively;

determining, as a set of files to be processed, all the files in the folder corresponding to the detected folder name that conforms to the first string matching rule.

Optionally, the first set determining module is specifically used for:

detecting whether the name of each folder in the electronic device conforms to a preset second string matching rule respectively;

determining, as a set of files to be processed, all the files in the folders corresponding to all the detected folder names that conform to the second string matching rule.

Optionally, the first set determining module is specifically used for:

judging whether the number of files in each folder in the electronic device is greater than or equal to a preset first threshold respectively;

if so, determining all the files in that folder as a set of files to be processed.

Optionally, the device further comprises: a type number determination module, wherein, the type number determination module is used for determining the number N of types of regular expression templates in the regular expression template library that match strings corresponding to the names of files in the set of files to be processed determined by the first set determining module;

the first detecting module is specifically used for:

when the number N of types determined by the type number determination module is less than or equal to a preset second threshold, for the obtained string corresponding to the name of each file, detecting whether a regular expression template matching the string is present in a preset regular expression template library.

Optionally, the device further comprises: a second detecting module, the second detecting module is used for detecting whether the number of strings which correspond to the names of files included in the set of files to be processed determined by the first set determining module and match any type of regular expression template among N types of regular expression templates determined by the type number determination module is greater than or equal to a preset third threshold;

the first detecting module is specifically used for:

when the number N of types determined by the type number determination module is less than or equal to the preset second threshold, and the second detecting module detects the number of strings which correspond to the names of files included in the set of files to be processed determined by the first set determining module and match any type of regular expression template among the N types of regular expression templates determined by the type number determination module is greater than or equal to the preset third threshold, detecting whether a regular expression template matching the string is present in the preset regular expression template library for the obtained string corresponding to the name of each file;

the first template determining module comprises: a first judging sub-module and a first template determining sub-module, wherein, the first judging sub-module is used for judging whether the number of strings which correspond to the names of files included in the set of files to be processed and match the regular expression template detected by the first detecting module is greater than or equal to a preset fourth threshold;

the first template determining sub-module is used for determining the regular expression template detected by the first detecting module as a regular expression template of the file name corresponding to the string when the judgment result from the first judging sub-module is YES.

Optionally, the device further comprises: a third detecting module, wherein, the third detecting module is used for detecting whether the number of strings which correspond to the names of files included in the set of files to be processed determined by the first set determining module and match any one of regular expression templates in the regular expression template library is greater than or equal to a preset fifth threshold;

the first detecting module is specifically used for:

when the third detecting module detects that the number of strings which correspond to the names of files included in the set of files to be processed determined by the first set determining module and match any one of regular expression templates in the regular expression template library is greater than or equal to the preset fifth threshold, detecting whether a regular expression template matching the string is present in the preset regular expression template library for the obtained string corresponding to the name of each file;

the first template determining module comprises: a second judging sub-module and a second template determining sub-module, wherein, the second judging sub-module is used for judging whether the number of strings which correspond to the names of files included in the set of files to be processed determined by the first set determining module and match the regular expression template detected by the first detecting module is greater than or equal to a preset sixth threshold;

the second template determining sub-module is used for determining the regular expression template detected by the first detecting module as a regular expression template of the file name corresponding to the string when the judgment result from the second judging sub-module is YES.

In order to achieve the above objects, embodiments of the present application disclose a device for file cleaning, applicable to an electronic device, the device comprises: a second set determining module, a second string obtaining module, a fourth detecting module, a second template determining module, a second regular expression identifying module, a matching module and a deleting module, wherein, the second set determining module is used for determining a set of files to be processed which includes at least one file;

the second string obtaining module is used for obtaining a string corresponding to the name of each file included in the set of files to be processed determined by the second set determining module;

the fourth detecting module is used for detecting whether a regular expression template matching the string is present in a preset regular expression template library for the string corresponding to the name of each file obtained by the second string obtaining module which includes at least one regular expression template;

the second template determining module is used for determining the regular expression template detected by the fourth detecting module as a regular expression template of the file name corresponding to the string;

the second regular expression identifying module is used for identifying a regular expression of the file name corresponding to the string according to the regular expression template determined by the second template determining module;

the matching module is used for matching the regular expression identified by the second regular expression identifying module with a regular expression in a preset regular expression library for file cleaning;

the deleting module is used for deleting the file corresponding to the regular expression matched by the matching module.

In order to achieve the above objects, an embodiment of the present application further provides an electronic device, comprising: a processor, a memory, a communication interface and a bus;

the processor, the memory and the communication interface being connected and communicated with each other via the bus;

the memory storing an executable code;

the processor running a program corresponding to the executable code by reading the executable code stored in the memory for executing any one of the methods for file name identification provided by embodiments of the present application.

In order to achieve the above objects, an embodiment of the present application further provides a storage medium for storing an executable code for executing any one of the methods for file name identification provided by embodiments of the present application.

In order to achieve the above objects, an embodiment of the present application further provides an executable code for executing any of the methods for file name identification provided by embodiments of the present application.

In order to achieve the above objects, an embodiment of the present application further provides an electronic device, comprising:

a processor, a memory, a communication interface and a bus;

the processor, the memory and the communication interface being connected and communicated with each other via the bus;

the memory storing an executable code;

the processor running a program corresponding to the executable code by reading the executable code stored in the memory for executing any one of the methods for file cleaning provided by embodiments of the present application.

In order to achieve the above objects, an embodiment of the present application further provides a storage medium for storing an executable code for executing any of the methods for file cleaning provided by embodiments of the present application.

In order to achieve the above objects, an embodiment of the present application further provides an executable code for executing any of the methods for file cleaning provided by embodiments of the present application.

As can be seen from the above technical solution, embodiments of the present application provide a method and device for file name identification and file cleaning, applicable to an electronic device. The method for file name identification comprises: determining a set of files to be processed; obtaining a string corresponding to the name of each file included in the set of files to be processed; detecting whether a regular expression template matching the string is present in a preset regular expression template library for the obtained string corresponding to the name of each file, determining the detected regular expression template as a regular expression template of the file name corresponding to the string; identifying a regular expression of the file name corresponding to the string according to the determined regular expression template. The technical solutions provided by embodiments of the present application are applied to enable automatic identification of file names and the cleaning of files in electronic devices, improving the efficiency of identifying file names in electronic devices and the efficiency of file cleaning.

BRIEF DESCRIPTION OF THE DRAWINGS

In order to describe the technical solutions of embodiments of the present application or of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

The technical solution in the embodiments of the present application will now be described in conjunction with the accompanying drawings in the embodiments of the present application, and it will be apparent that the described embodiments are only part of the embodiments of the present application rather than all of the embodiments. Based on the embodiments of the present application, all other embodiments obtained by those of ordinary skill in the art without making creative work are within the protection scope of the present application.

It is to be noted that the embodiments of the present application are preferably applicable to electronic devices such as electronic devices installed with an IOS operating system (IOS is a handheld device operating system developed by Apple Inc.) or an Android operating system (Android system is a Linux-based free and open source code operating system), or a Windows Phone operating system (Windows Phone is a mobile phone operating system released by Microsoft Inc.), and of course also applicable to other electronic devices, to which the present application is not limited.

Figure 1:
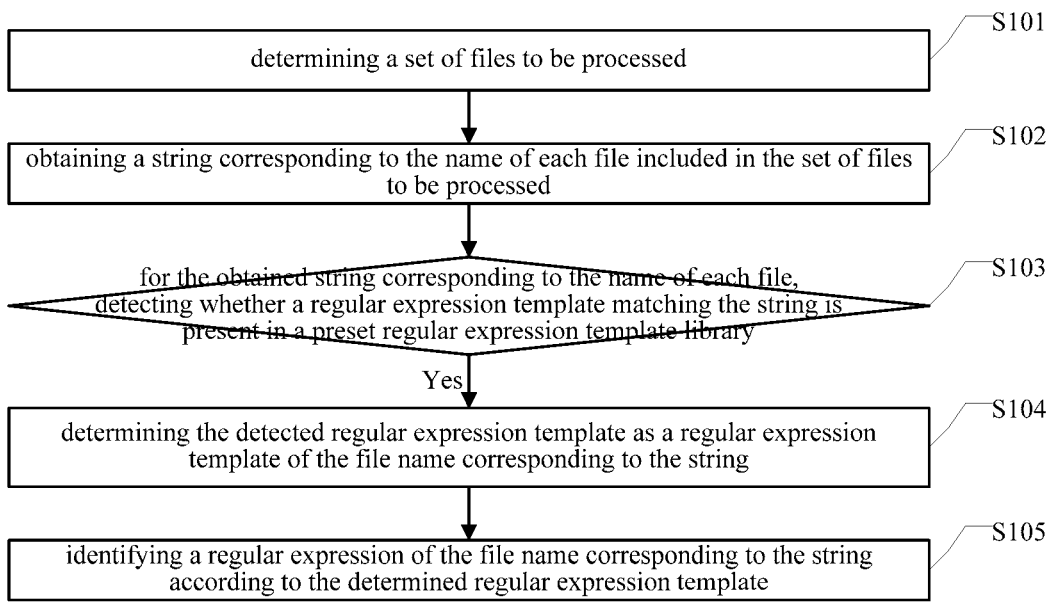
FIG. 1 is a first schematic flowchart of a method for file name identification provided by an embodiment of the present application.

FIG. 1 is a first schematic flowchart of a method for file name identification provided by an embodiment of the present application, the method may comprise the steps of:

S101: determining a set of files to be processed;
wherein, the set of files to be processed includes at least one file;

S102: obtaining a string corresponding to the name of each file included in the set of files to be processed;

S103: for the obtained string corresponding to the name of each file, detecting whether a regular expression template matching the string is present in a preset regular expression template library, if so, executing S104;
wherein, the preset regular expression template library includes at least one regular expression template;

S104: determining the detected regular expression template as a regular expression template of the file name corresponding to the string;

S105: identifying a regular expression of the file name corresponding to the string according to the determined regular expression template.

Specifically, in practical applications, all the files in an electronic device can be determined as a set of files to be processed. It is also possible to determine all the files in each folder in the electronic device as a set of files to be processed respectively. It is also possible to judge whether the number of files in each folder in the electronic device is greater than or equal to a preset first threshold respectively; and if so, determine all the files in that folder as a set of files to be processed. For example, judge whether the number of files in a folder AAAA (i.e., a folder whose name is AAAA) is greater than or equal to 100, and if so, determine all the files in the folder AAAA as a set of files to be processed.

In practical applications, it is also possible to detect whether the name of each folder in an electronic device conforms to a preset first string matching rule respectively; and determine, as a set of files to be processed, all the files in the folder corresponding to the detected folder name that conforms to the first string matching rule. For example, when the preset first string matching rule is that the number of characters in a string corresponding to a file name is greater than or equal to 15, detect whether the number of characters in a string corresponding to the name of each folder in an electronic device is greater than or equal to 15 respectively, and determine, as a set of files to be processed, all the files in all the folders whose folder names correspond to strings in which the number of characters is greater than or equal to 15 respectively.

In practical applications, it is also possible to detect whether the name of each folder in an electronic device conforms to a preset second string matching rule respectively; and determine, as a set of files to be processed, all the files in the folders corresponding to all the detected folder names that conform to the second string matching rule. For example, when the preset second string matching rule is that the number of characters in a string corresponding to a file name is greater than or equal to 15, detect whether the number of characters in a string corresponding to the name of each folder in an electronic device is greater than or equal to 15 respectively, and determine, as a set of files to be processed, all the files in all the folders whose folder names correspond to strings in which the number of characters is greater than or equal to 15.

In practical applications, for randomly generated files, the name of the randomly generated file normally corresponds to a longer string, therefore it is also possible to detect whether the name of each file in an electronic device conforms to a preset third string matching rule respectively; and determine, as a set of files to be processed, all the files corresponding to the detected file names that conform to the third string matching rule. For example, when the preset third string matching rule is that the number of characters in a string corresponding to a file name is greater than or equal to 15, detect whether the number of characters in a string corresponding to the name of each file in an electronic device is greater than or equal to 15 respectively, determine all the files whose file names correspond to strings in which the number of characters is greater than or equal to 15 as randomly generated files, and determine the randomly generated files as a set of files to be processed.

Assuming that the set of files to be processed is all the files in the folder AAAA in an electronic device, wherein, the folder AAAA contains ten files, which are: Andriod, bluetooth, DCIM, Download, Movies, Music, Photos, zijizhaopian, 201501010805, 20150108luzhi respectively, and the corresponding strings obtained for the above 10 files are: "Andriod", "bluetooth", "DCIM", "Download", "Movies", "Music", "Photos", "zijizhaopian", "201501010805", "20150108luzhi" respectively.

Assuming that a preset regular expression template library includes seven regular expression templates, which are:

[0-9]{s %}, s % represents the length of a string, used to identify strings containing only numbers;

[a-z]{s %}, s % represents the length of a string, used to identify strings containing only lower case letters;

[A-Z]{s %}, s % represents the length of a string, used to identify strings containing only upper case letters;

[0-9a-z]{s %}, s % represents the length of a string, used to identify strings containing only numbers and lower case letters;

[0-9A-Z]{s %}, s % represents the length of a string, used to identify strings containing only numbers and upper case letters;

[a-zA-Z]{s %}, s % represents the length of a string, used to identify strings containing only lower case letters and upper case letters;

[0-9a-zA-Z]{s %}, s % represents the length of a string, used to identify strings containing only numbers, lower case letters and upper case letters.

For the above ten strings, detect whether a regular expression template matching the string is present in a preset regular expression template library respectively, determine the detected regular expression template as a regular expression template of the file name corresponding to the string, and identify a regular expression of the file name corresponding to the string according to the determined regular expression template.

Taking "Andriod" in the above ten strings for example, detect whether a regular expression template matching the string "Andriod" is present in a preset regular expression template library, the detection result is YES, and the detected regular expression template is [a-zA-Z]{s %}, then [a-zA-Z]{s %} is determined as the regular expression template of the file name "Andriod", the length of the string "Andriod" is determined as 7 based on [a-zA-Z]{s %}, the regular expression of the file name "Andriod" is identified as "[a-zA-Z]{7}".

The regular expression of the file name "bluetooth" is identified as "[a-z]{9}";

the regular expression of the file name "DCIM" is identified as "[A-Z]{4}";

the regular expression of the file name "Download" is identified as "[a-zA-Z]{8}";

the regular expression of the file name "Movies" is identified as "[a-zA-Z]{6}";

the regular expression of the file name "Music" is identified as "[a-zA-Z]{5}";

the regular expression of the file name "Photos" is identified as "[a-zA-Z]{6}";

the regular expression of the file name "zijizhaopian" is identified as "[a-z]{12}";

the regular expression of the file name "201501010805" is identified as "[0-9]{12}";

the regular expression of the file name "20150108luzhi" is identified as "[0-9a-z]{13}".

Specifically, in practical applications, it is also possible to determine a regular expression for a file name containing a segmentation symbol, the segmentation symbol can be: '+', '–', '.', '[', ']', '(',')', '{','}', '"', '_', '@', ',', '#', '%', ''', ';', '$', '=', '~', '"', '!', ' ' and so on.

For example, assuming a file containing an extension is rj.jpg, the regular expression template is [a-zs %] {s %}, where the first s % represents a segmentation symbol and the second s % represents the length of the string; the regular expression of the file whose file name is rj and whose extension is .jpg is identified as [a-z.] {5} according to [a-zs %] {s %}.

It should be noted that all the files in the folder AAAA in an electronic device and seven regular expression templates included in a preset regular expression template library are illustrated above as only one specific example of the present application, and are not intended to limit the present application.

The embodiment of the present application shown in FIG. 1 is applied to enable automatic identification of file names in electronic devices, improving the efficiency of identifying file names in electronic devices.

Figure 2:
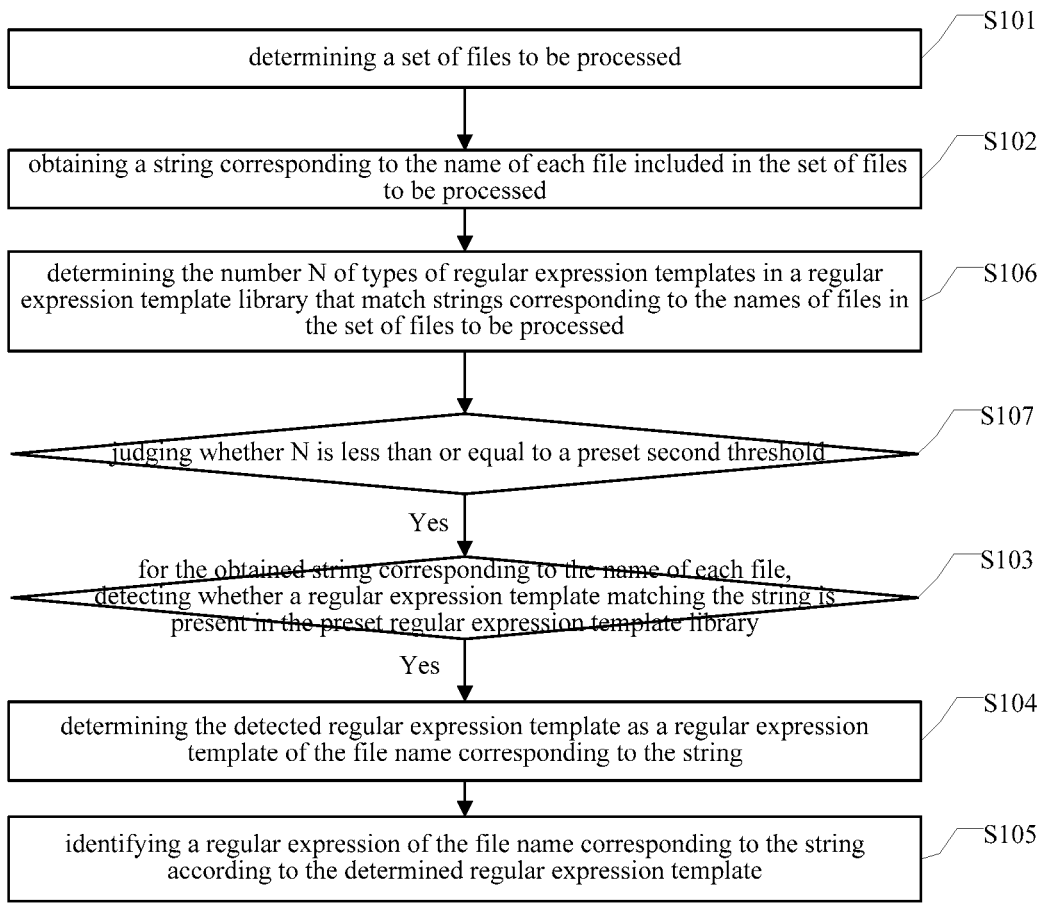
FIG. 2 is a second schematic flowchart of a method for file name identification provided by an embodiment of the present application.

FIG. 2 is a second schematic flowchart of a method for file name identification provided by an embodiment of the present application, on the basis of the embodiment shown in FIG. 1, the following two steps are added in the embodiment shown in FIG. 2:

S106: determining the number N of types of regular expression templates in the regular expression template library that match strings corresponding to the names of files in the set of files to be processed;

S107: judging whether N is less than or equal to a preset second threshold, if so, executing S103.

Specifically, in practical applications, if the number of types of regular expression templates in the regular expression template library that match strings corresponding to the names of files in the set of files to be processed is larger than a certain value, it is considered that there is no need to identify file names in the set of files to be processed.

Take all the files in the folder AAAA in an electronic device and seven regular expression templates included in a preset regular expression template library for example.

The number of types of regular expression templates in a regular expression template library that match strings corresponding to the file names of all the files in the folder AAAA is determined as five, the five types of regular expression templates are: [0-9]{s %}, [a-z]{s %}, [A-Z]{s %}, [a-zA-Z]{s %} and [0-9a-z]{s %} respectively. Assuming that the preset second threshold is 6, judge whether the number of types of regular expression templates, which is determined as 5, is less than or equal to 6, and the judgment result is YES, then perform a regular expression identification operation on the obtained string corresponding to the name of each file respectively. Assuming that the preset second threshold is 3, judge whether the number of types of regular expression templates, which is determined as 5, is less than or equal to 3, and the judgment result is NO, then perform no regular expression identification operations for the obtained string corresponding to the name of each file.

It should be noted that all the files in the folder AAAA in an electronic device and seven regular expression templates included in a preset regular expression template library are illustrated above as only one specific example of the present application, and are not intended to limit the present application.

When the number of types of regular expression templates in a regular expression template library that match strings corresponding to the names of files included in the set of files to be processed is less than or equal to a certain value, the embodiment of the present application shown in FIG. 2 is applied to enable automatic identification of file names in electronic devices, improving the efficiency of identifying file names in electronic devices.

Figure 3:
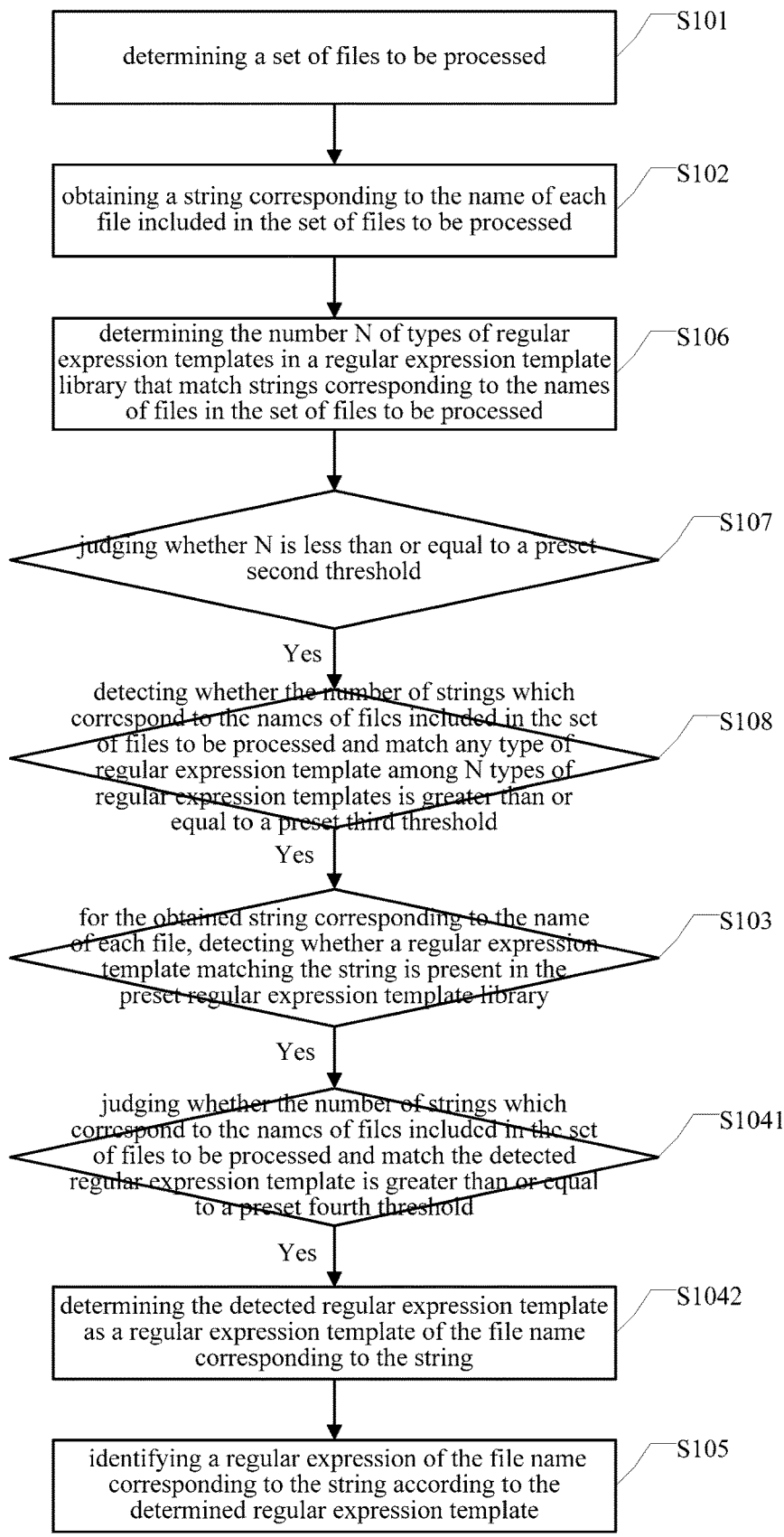
FIG. 3 is a third schematic flowchart of a method for file name identification provided by an embodiment of the present application.

FIG. 3 is a third schematic flowchart of a method for file name identification provided by an embodiment of the present application; on the basis of the embodiment shown in FIG. 2, S108 is added in the embodiment shown in FIG. 3:

S108: detecting whether the number of strings which correspond to the names of files included in the set of files to be processed and match any type of regular expression template among N types of regular expression templates is greater than or equal to a preset third threshold; if so, executing S103;

S104 in the present embodiment may include: S1041 and S1042, wherein,

S1041: judging whether the number of strings which correspond to the names of files included in the set of files to be processed and match the detected regular expression template is greater than or equal to a preset fourth threshold; if so, executing S1042;

S1042: determining the detected regular expression template as a regular expression template of the file name corresponding to the string.

Specifically, in practical applications, when the number of types of the determined regular expression templates is less than or equal to a certain value, if the number of strings which correspond to the names of files included in the set of files to be processed and match all the regular expression templates of the determined regular expression templates is less than a certain value, it is considered that there is no need to identify the names of the files in the set of files to be processed.

Take all the files in the folder AAAA in an electronic device and seven regular expression templates included in a preset regular expression template library for example.

In practical applications, the preset third threshold and the preset fourth threshold can be identical or different; assuming that both the preset third threshold and the preset fourth threshold are 5. If the number of strings which correspond to the names of files included in the set of files to be processed and match one type of regular expression template [a-zA-Z]{s %} among the determined regular expression templates is equal to 5, identify the names of the files in the set of files to be processed.

For the above ten strings, detect whether a regular expression template matching the string is present in a preset regular expression template library respectively; judge whether the number of strings which correspond to the names of files included in the set of files to be processed and match the detected regular expression template is greater than or equal to 5; if so, determine the detected regular expression template as a regular expression template of the file name corresponding to the string, and identify a regular expression of the file name corresponding to the string according to the determined regular expression template.

Taking "Andriod" in the above ten strings for example, detect whether a regular expression template matching the string "Andriod" is present in a preset regular expression template library, the detection result is YES and the detected regular expression template is [a-zA-Z]{s %}; judge whether the number of strings which correspond to the names of files included in the folder AAAA and match the detected regular expression template [a-zA-Z]{s %} is greater than or equal to 5, and the judgment result is YES, then [a-zA-Z]{s %} is determined as the regular expression template of the file name "Andriod", the length of the string "Andriod" is determined as 7, and the regular expression of the file name "Andriod" is identified as "[a-zA-Z]{7}" based on [a-zA-Z]{s %}.

Taking "bluetooth" in the above ten strings for example, detect whether a regular expression template matching the string "bluetooth" is present in a preset regular expression template library, the detection result is YES and the detected regular expression template is [a-z]{s %}; judge whether the number of strings which correspond to the names of files included in the folder AAAA and match the detected regular expression template [a-z]{s %} is greater than or equal to 5, and the judgment result is NO, then [a-z]{s %} is not determined as the regular expression template of the file name "bluetooth", and the regular expression of the file name "bluetooth" is not identified.

The identification results of regular expressions for the above ten strings are as follows: the regular expression of the file name "Andriod" is "[a-zA-Z]{7}"; the regular expression of the file name "Download" is "[a-zA-Z]{8}"; the regular expression of the file name "Movies" is "[a-zA-Z]{6}"; the regular expression of the file name "Music" is "[a-zA-Z]{5}"; the regular expression of the file name "Photos" is "[a-zA-Z]{6}".

It should be noted that all the files in the folder AAAA in an electronic device and seven regular expression templates included in a preset regular expression template library are illustrated above as only one specific example of the present application, and are not intended to limit the present application.

When the number of types of regular expression templates in the regular expression template library that match strings corresponding to the names of files in the set of files to be processed is less than or equal to a certain value, and the number of strings which correspond to the names of files included in the set of files to be processed and match any type of regular expression template among N types of regular expression templates is greater than or equal to a certain value, the embodiment of the present application shown in FIG. 3 is applied to enable automatic identification of file names in electronic devices, improving the efficiency of identifying file names in electronic devices.

Figure 4:
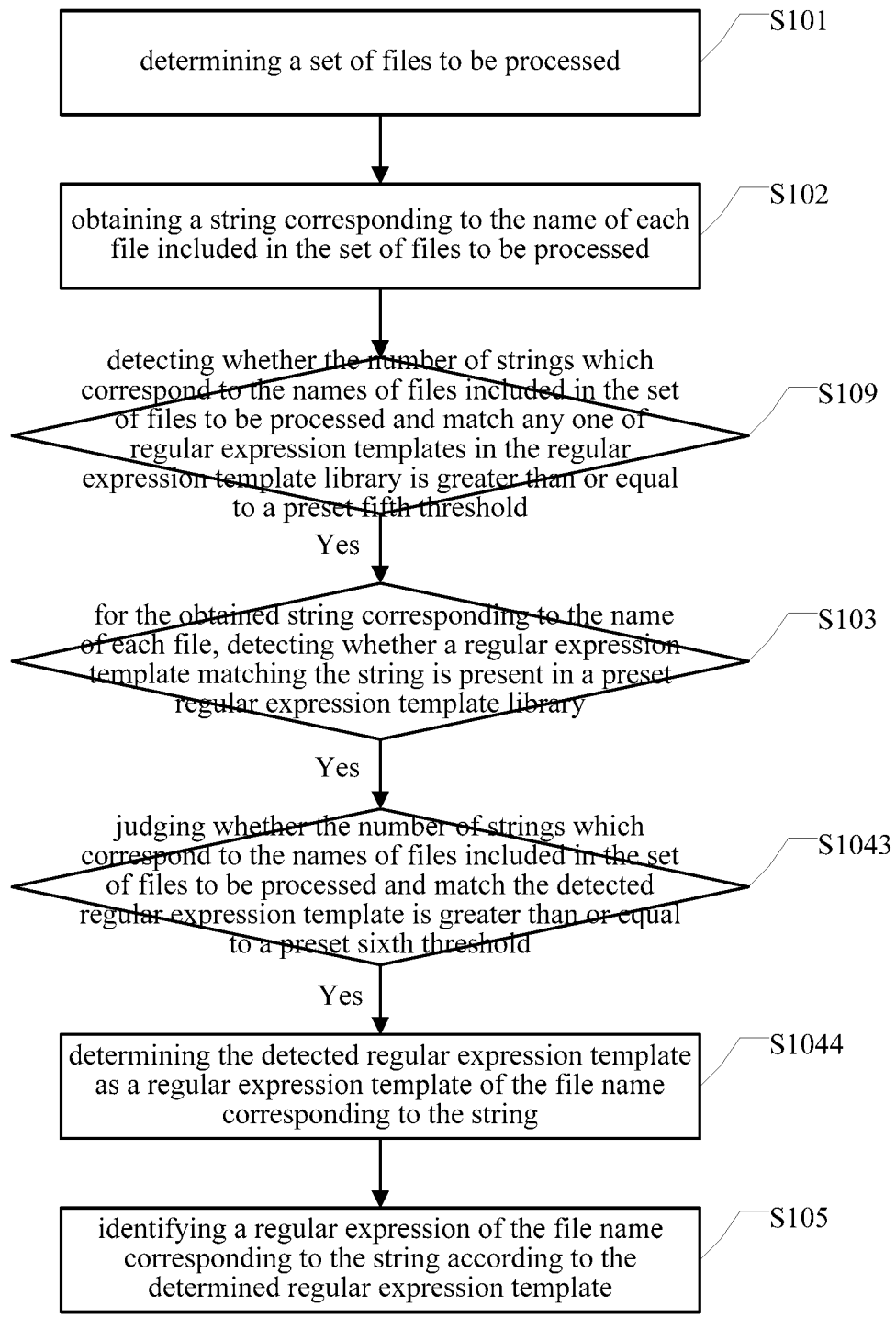
FIG. 4 is a fourth schematic flowchart of a method for file name identification provided by an embodiment of the present application.

FIG. 4 is a fourth schematic flowchart of a method for file name identification provided by an embodiment of the present application; on the basis of the embodiment shown in FIG. 1, S109 is added in the embodiment shown in FIG. 4:

S109: detecting whether the number of strings which correspond to the names of files included in the set of files to be processed and match any one of regular expression templates in the regular expression template library is greater than or equal to a preset fifth threshold, if so, executing S103;

S104 in the present embodiment may include: S1043 and S1044, wherein,

S1043: judging whether the number of strings which correspond to the names of files included in the set of files to be processed and match the detected regular expression template is greater than or equal to a preset sixth threshold, if so, executing S1044;

S1044: determining the detected regular expression template as a regular expression template of the file name corresponding to the string.

Specifically, in practical applications, if the number of strings which correspond to the names of files in the set of files to be processed and match all the regular expression templates in the preset regular expression template library is less than a certain value, it is considered that there is no need to identify the names of the files in the set of files to be processed.

Take all the files in the folder AAAA in an electronic device and seven regular expression templates included in a preset regular expression template library for example.

In practical applications, the preset fifth threshold and the preset sixth threshold can be identical or different, assuming both the preset fifth threshold and the preset sixth threshold are 5. If the number of strings which correspond to the names of files included in the set of files to be processed and match one type of regular expression template [a-zA-Z]{s %} in the preset regular expression template library is equal to 5, identify the names of the files in the set of files to be processed.

For the above ten strings, detect whether a regular expression template matching the string is present in a preset regular expression template library respectively; judge whether the number of strings which correspond to the names of files included in the set of files to be processed and match the detected regular expression template is greater than or equal to 5; if so, determine the detected regular expression template as a regular expression template of the file name corresponding to the string, and identify a regular expression of the file name corresponding to the string according to the determined regular expression template.

Taking "Andriod" in the above ten strings for example, detect whether a regular expression template matching the string "Andriod" is present in a preset regular expression template library, the detection result is YES and the detected regular expression template is [a-zA-Z]{s %}; judge whether the number of strings which correspond to the names of files included in the folder AAAA and match the detected regular expression template [a-zA-Z]{s %} is greater than or equal to 5, and the judgment result is YES, then [a-zA-Z]{s %} is determined as the regular expression template of the file name "Andriod"; the length of the string "Andriod" is determined as 7, and the regular expression of the file name "Andriod" is identified as "[a-zA-Z]{7}" based on [a-zA-Z]{s %}.

Taking "bluetooth" in the above ten strings for example, detect whether a regular expression template matching the string "bluetooth" is present in a preset regular expression template library, the detection result is YES and the detected regular expression template is [a-z]{s %}; judge whether the number of strings which correspond to the names of files included in the folder AAAA and match the detected regular expression template [a-z]{s %} is greater than or equal to 5, and the judgment result is NO, then [a-z]{s %} is not determined as the regular expression template of the file name "bluetooth", and the regular expression of the file name "bluetooth" is not identified.

The identification results of regular expressions for the above ten strings are as follows: the regular expression of the file name "Andriod" is "[a-zA-Z]{7}"; the regular expression of the file name "Download" is "[a-zA-Z]{8}"; the regular expression of the file name "Movies" is "[a-zA-Z]{6}"; the regular expression of the file name "Music" is "[a-zA-Z]{5}"; the regular expression of the file name "Photos" is "[a-zA-Z]{6}".

It should be noted that all the files in the folder AAAA in an electronic device and seven regular expression templates included in a preset regular expression template library are illustrated above as only one specific example of the present application, and are not intended to limit the present application.

When the number of strings which correspond to the names of files included in the set of files to be processed and match any one of regular expression templates in a preset regular expression template library is greater than or equal to a certain value, the embodiment of the present application shown in FIG. 4 is applied to enable automatic identification of file names in electronic devices, improving the efficiency of identifying file names in electronic devices.

Figure 5:
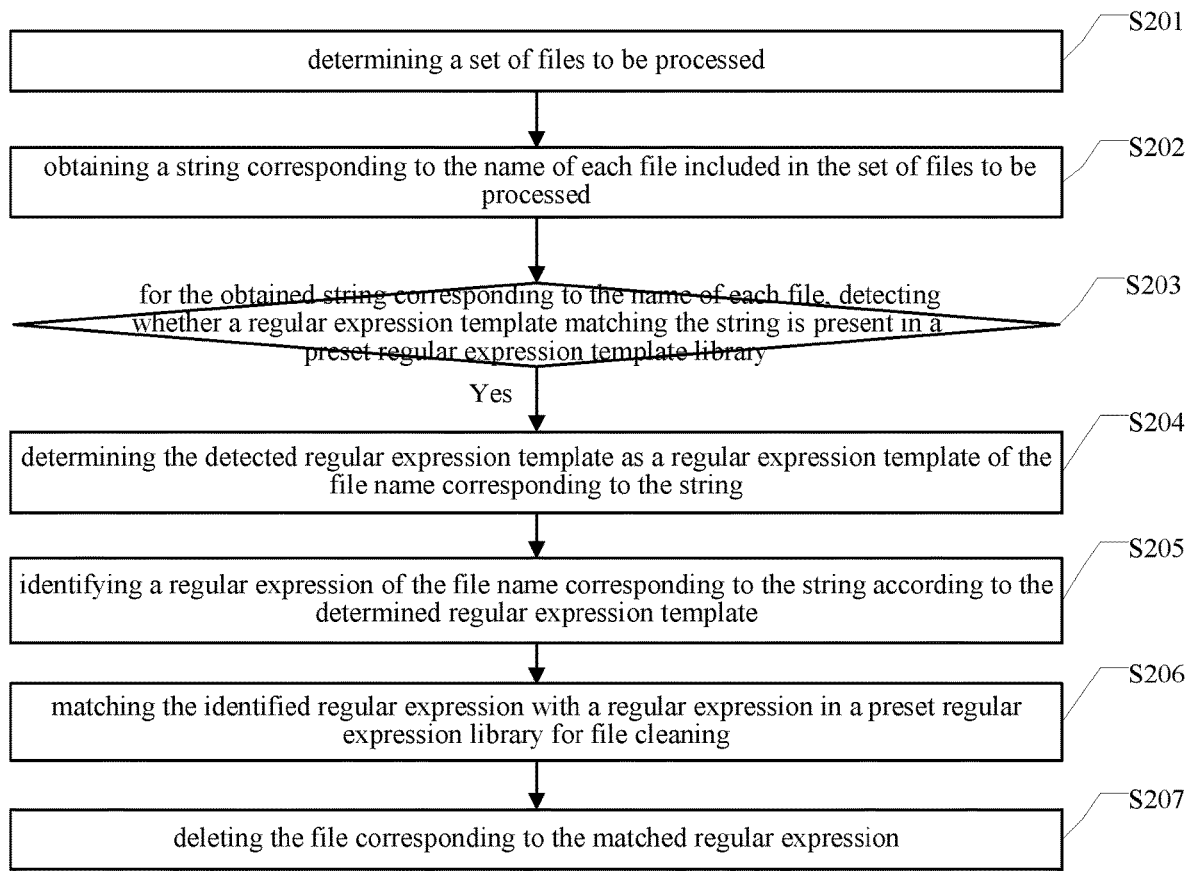
FIG. 5 is a schematic flowchart of a method for file cleaning provided by an embodiment of the present application.

FIG. 5 is a schematic flowchart of a method for file cleaning provided by an embodiment of the present application, the method may comprise:

S201: determining a set of files to be processed;
wherein, the set of files to be processed includes at least one file;
S202: obtaining a string corresponding to the name of each file included in the set of files to be processed;
S203: for the obtained string corresponding to the name of each file, detecting whether a regular expression template matching the string is present in a preset regular expression template library, if so, executing S204;
wherein, the preset regular expression template library includes at least one regular expression template;
S204: determining the detected regular expression template as a regular expression template of the file name corresponding to the string.
S205: identifying a regular expression of the file name corresponding to the string according to the determined regular expression template;
S206: matching the identified regular expression with a regular expression in a preset regular expression library for file cleaning;
S207: deleting the file corresponding to the matched regular expression.

Specifically, S201 to S205 in the embodiment of the present application can be referred to the above-mentioned method for file name identification, and will not be described repeatedly in present embodiment.

Assuming that the regular expressions in a preset regular expression library for file cleaning include: "[a-zA-Z] {1}", "[a-zA-Z] {2}","[a-zA-Z] {3}" . . . "[a-zA-Z] {30}".

Assuming that the identification result of file names is: the regular expression of the file name "Andriod" is "[a-zA-Z] {7}", which matches the regular expression "[a-zA-Z]{7}" in the preset regular expression library for file cleaning, then the file Andriod in the folder AAAA corresponding to "[a-zA-Z]{7}" is deleted.

Assuming that the identification result of a file name is: the regular expression of the file name "bluetooth" is "[a-z]{9}", which matches any regular expression in the preset regular expression library for file cleaning, then the file bluetooth in the folder AAAA corresponding to "[a-z]{9}" is not deleted.

The embodiment of the present application shown in FIG. 5 is applied to enable automatic identification of file names in electronic devices, by matching the identified regular expression with a regular expression in a regular expression library for file cleaning, files can be cleaned up, achieving the cleaning of the files in the electronic devices.

In accordance with the above-described embodiments of a method, an embodiment of the present application further provides a device for file name identification.

Figure 6:
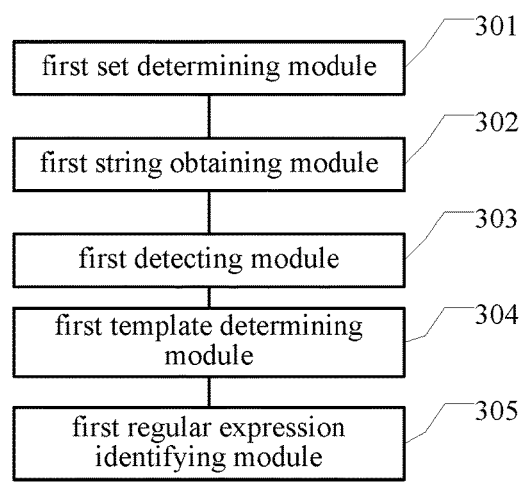
FIG. 6 is a schematic diagram of a first structure of a device for file name identification provided by an embodiment of the present application.

FIG. 6 is a schematic diagram of a first structure of a device for file name identification provided by an embodiment of the present application, the device may comprise: a first set determining module 301, a first string obtaining module 302, a first detecting module 303, a first template determining module 304 and a first regular expression identifying module 305, wherein, the first set determining module 301 is used for determining a set of files to be processed which includes at least one file;
the first set determining module 301 in the embodiment of the present application can be specifically used for:
determining all the files in each folder in the electronic device as a set of files to be processed respectively;
the first set determining module 301 in the embodiment of the present application can be specifically used for:
detecting whether the name of each folder in the electronic device conforms to the preset first string matching rule respectively;
determining, as a set of files to be processed, all the files in the folder corresponding to the detected folder name that conforms to the first string matching rule respectively;
the first set determining module 301 in the embodiment of the present application can be specifically used for:
detecting whether the name of each folder in the electronic device conforms to the preset second string matching rule respectively;
determining, as a set of files to be processed, all the files in the folders corresponding to all the detected folder names that conform to the second string matching rule;
the first set determining module 301 in the embodiment of the present application can be specifically used for:
judging whether the number of files in each folder in the electronic device is greater than or equal to a preset first threshold respectively;
if so, determining all the files in that folder as a set of files to be processed;
the first string obtaining module 302 is used for obtaining a string corresponding to the name of each file included in the set of files to be processed determined by the first set determining module 301;
the first detecting module 303 is used for detecting whether a regular expression template matching the string is present in a preset regular expression template library for the string corresponding to the name of each file obtained by the first string obtaining module 302 which includes at least one regular expression template;
the first template determining module 304 is used for determining the regular expression template detected by the first detecting module 303 as a regular expression template of the file name corresponding to the string;

the first regular expression identifying module 305 is used for identifying a regular expression of the file name corresponding to the string according to the regular expression template determined by the first template determining module 304.

The embodiment of the present application shown in FIG. 6 is applied to enable automatic identification of file names in electronic devices, improving the efficiency of identifying file names in electronic devices.

Figure 7:
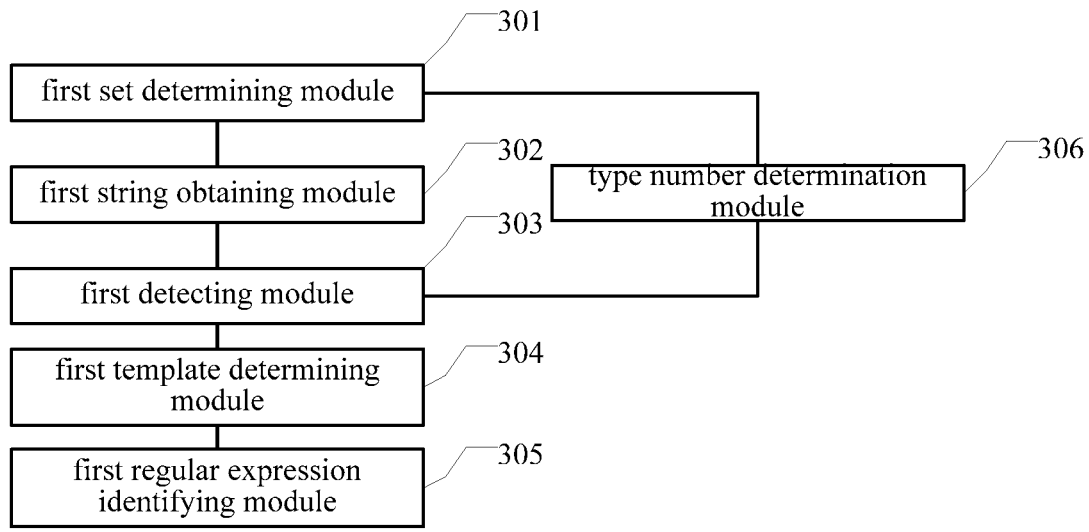
FIG. 7 is a schematic diagram of a second structure of a device for file name identification provided by an embodiment of the present application.

FIG. 7 is a schematic diagram of a second structure of a device for file name identification provided by an embodiment of the present application, on the basis of the embodiment shown in FIG. 6, a type number determination module 306 is added in the embodiment shown in FIG. 7:

the type number determination module 306 is used for determining the number N of types of regular expression templates in the regular expression template library that match strings corresponding to the names of files in the set of files to be processed determined by the first set determining module 301;

the first detecting module 303 in the embodiment of the present application can be specifically used for:

when the number N of types determined by the type number determination module 306 is less than or equal to a preset second threshold, for the obtained string corresponding to the name of each file, detecting whether a regular expression template matching the string is present in a preset regular expression template library.

When the number of types of regular expression templates in the regular expression template library that match strings corresponding to the names of files included in the set of files to be processed is less than or equal to a certain value, the embodiment of the present application shown in FIG. 7 is applied to enable automatic identification of file names in electronic devices, improving the efficiency of identifying file names in electronic devices.

Figure 8:
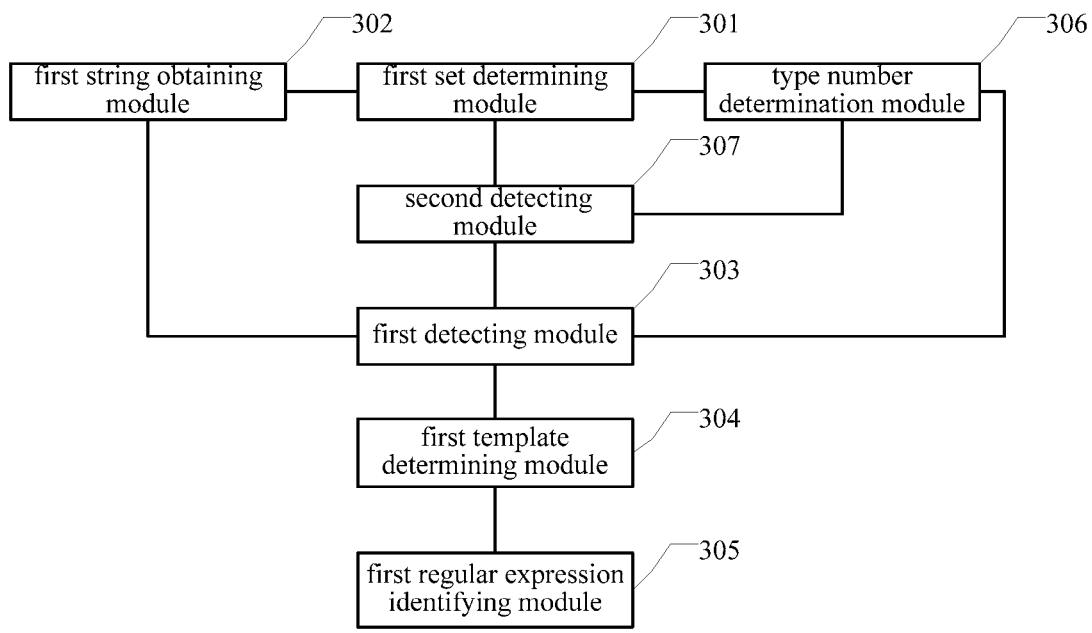
FIG. 8 is a schematic diagram of a third structure of a device for file name identification provided by an embodiment of the present application.

FIG. 8 is a schematic diagram of a third structure of a device for file name identification provided by an embodiment of the present application, on the basis of the embodiment shown in FIG. 6, a second detecting module 307 is added in the embodiment shown in FIG. 8:

the second detecting module 307 is used for detecting whether the number of strings which correspond to the names of files included in the set of files to be processed determined by the first set determining module 306 and match any type of regular expression template among N types of regular expression templates determined by the type number determination module is greater than or equal to a preset third threshold;

the first detecting module 303 in the embodiment of the present application can be specifically used for:

when the number N of types determined by the type number determination module 306 is less than or equal to the preset second threshold, and it the second detecting module 307 detects that the number of strings which correspond to the names of files included in the set of files to be processed determined by the first set determining module 301 and match any type of regular expression template among the N types of regular expression templates determined by the type number determination module is greater than or equal to the preset third threshold, detecting whether a regular expression template matching the string is present in the preset regular expression template library for the obtained string corresponding to the name of each file;

the first template determining module 304 in the embodiment of the present application may comprise: a first judging sub-module and a first template determining sub-module (not shown), wherein, the first judging sub-module is used for judging whether the number of strings which correspond to the names of files included in the set of files to be processed and match the regular expression template detected by the first detecting module 303 is greater than or equal to a preset fourth threshold;

the first template determining sub-module is used for determining the regular expression template detected by the first detecting module 303 as a regular expression template of the file name corresponding to the string when the judgment result from the first judging sub-module is YES;

In practical applications, the preset third threshold and the preset fourth threshold may be identical or different.

When the number of types of regular expression templates in a regular expression template library that match strings corresponding to the names of files in the set of files to be processed is less than or equal to a certain value, and the number of strings which correspond to the names of files included in the set of files to be processed and match any type of regular expression template among the N types of regular expression templates is greater than or equal to a certain value, the embodiment of the present application shown in FIG. 8 is applied to enable automatic identification of file names in electronic devices, improving the efficiency of identifying file names in electronic devices.

Figure 9:
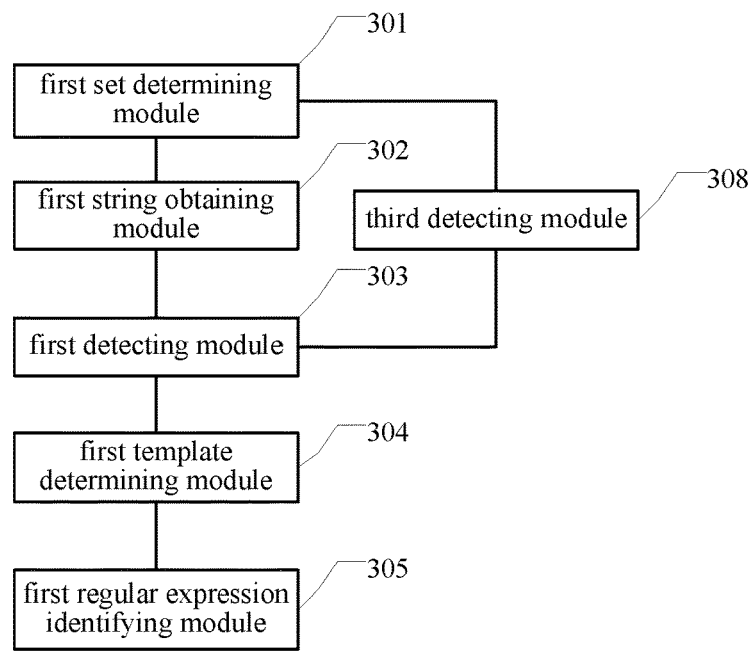
FIG. 9 is a schematic diagram of a fourth structure of a device for file name identification provided by an embodiment of the present application.

FIG. 9 is a schematic diagram of a fourth structure of a device for file name identification provided by an embodiment of the present application, on the basis of the embodiment shown in FIG. 6, a third detecting module 309 is added in the embodiment shown in FIG. 9:

the third detecting module 309 is used for detecting whether the number of strings which correspond to the names of files included in the set of files to be processed determined by the first set determining module 301 and match any one of regular expression templates in the regular expression template library is greater than or equal to a preset fifth threshold;

the first detecting module 303 in the embodiment of the present application can be specifically used for:

when the third detecting module 309 detects that the number of strings which correspond to the names of files included in the set of files to be processed determined by the first set determining module 301 and match any one of regular expression templates in the regular expression template library is greater than or equal to the preset fifth threshold, detecting whether a regular expression template matching the string is present in a preset regular expression template library for the obtained string corresponding to the name of each file;

the first template determining module 304 in the embodiment of the present application may comprise: a second judging sub-module and a second template determining sub-module (not shown), wherein, the second judging sub-module is used for judging whether the number of strings which correspond to the names of files included in the set of files to be processed determined by the first set determining module 301 and match the regular expression template detected by the first detecting module 303 is greater than or equal to the preset sixth threshold;

the second template determining sub-module is used for determining the regular expression template detected by the first detecting module 303 as a regular expression template of the file name corresponding to the string when the judgment result from the second judging sub-module is YES;

In practical applications, the preset fifth threshold and the preset sixth threshold may be identical or different.

When the number of strings which correspond to the names of files included in the set of files to be processed and match any type of regular expression template among the preset regular expression templates is greater than or equal to a certain value, the embodiment of the present application shown in FIG. 9 is applied to enable automatic identification of file names in electronic devices, improving the efficiency of identifying file names in electronic devices.

In accordance with the above-described method embodiment, the embodiment of the present application further provides a device for file cleaning.

Figure 10:
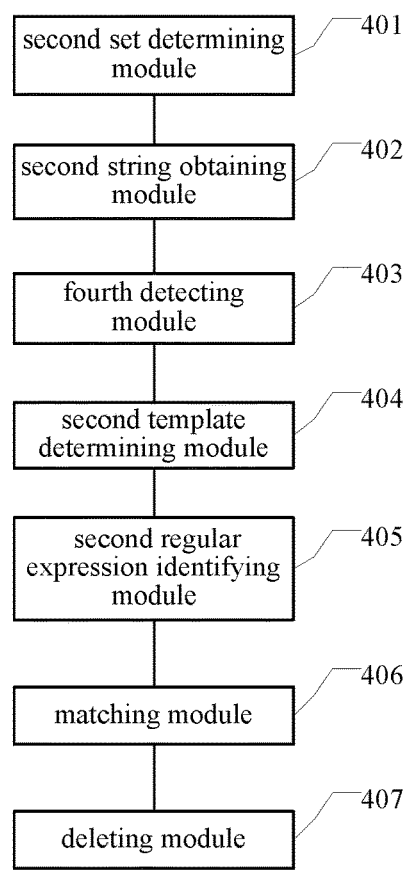
FIG. 10 is a schematic structural diagram of a device for file cleaning provided by an embodiment of the present application.

FIG. 10 is a schematic structural diagram of a device for file cleaning provided by an embodiment of the present application, the device may comprise: a second set determining module 401, a second string obtaining module 402, a fourth detecting module 403, a second template determining module 404 and a second regular expression identifying module 405, a matching module 406, and a deleting module 407, wherein, the second set determining module 401 is used for determining a set of files to be processed which includes at least one file;

the second string obtaining module 402 is used for obtaining a string corresponding to the name of each file included in the set of files to be processed determined by the second set determining module 401;

the fourth detecting module 403 is used for detecting whether a regular expression template matching the string is present in a preset regular expression template library for the string corresponding to the name of each file obtained by the second string obtaining module 402 which includes at least one regular expression template;

the second template determining module 404 is used for determining the regular expression template detected by the fourth detecting module 403 as a regular expression template of the file name corresponding to the string;

the second regular expression identifying module 405 is used for identifying a regular expression of the file name corresponding to the string according to the regular expression template determined by the second template determining module 404.

the matching module 406 is used for matching the regular expression identified by the second regular expression identifying module 405 with a regular expression in a preset regular expression library for file cleaning;

the deleting module 407 is used for deleting the file corresponding to the regular expression matched by the matching module 407.

The embodiment of the present application shown in FIG. 10 is applied to enable automatic identification of file names in electronic devices, by matching the identified regular expression with a regular expression in a regular expression library for file cleaning, the files can be cleaned up, achieving the cleaning of the files in the electronic devices.

In addition, an embodiment of the present application further provides an electronic device, comprising: a processor, a memory, a communication interface and a bus;

the processor, the memory and the communication interface being connected and communicated with each other via the bus;

the memory storing an executable code;

the processor running a program corresponding to the executable code by reading the executable code stored in the memory for executing the method for file name identification provided by the embodiment of the present application, wherein, the method for file name identification provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template.

Wherein, determining a set of files to be processed comprises:

determining all the files in each folder in the electronic device as a set of files to be processed.

Wherein, determining a set of files to be processed comprises:

detecting whether the name of each folder in the electronic device conforms to a preset first string matching rule respectively;

determining, as a set of files to be processed, all the files in the folder corresponding to the detected folder name that conforms to the first string matching rule.

Wherein, determining a set of files to be processed comprises:

detecting whether the name of each folder in the electronic device conforms to a preset second string matching rule respectively;

determining, as a set of files to be processed, all the files in the folders corresponding to all the detected folder names that conform to the second string matching rule.

Wherein, determining a set of files to be processed comprises:

judging whether the number of files in each folder in the electronic device is greater than or equal to a preset first threshold respectively;

if so, determining all the files in that folder as a set of files to be processed.

Wherein, before performing a regular expression identification operation on the obtained string corresponding to the name of each file respectively, the method further comprises:

determining the number N of types of regular expression templates in the regular expression template library that match strings corresponding to the names of files in the set of files to be processed;

performing a regular expression identification operation on the obtained string corresponding to the name of each file respectively, comprises:

when N is less than or equal to a preset second threshold, performing a regular expression identification operation on the obtained string corresponding to the name of each file respectively.

Wherein, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

Wherein, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

In addition, an embodiment of the present application further provides a storage medium for storing an executable code for executing the method for file name identification provided by the embodiment of the present application, wherein, the method for file name identification provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template.

Wherein, determining a set of files to be processed comprises:

determining all the files in each folder in the electronic device as a set of files to be processed.

Wherein, determining a set of files to be processed comprises:

detecting whether the name of each folder in the electronic device conforms to a preset first string matching rule respectively;

determining, as a set of files to be processed, all the files in the folder corresponding to the detected folder name that conforms to the first string matching rule.

Wherein, determining a set of files to be processed comprises:

detecting whether the name of each folder in the electronic device conforms to a preset second string matching rule respectively;

determining, as a set of files to be processed, all the files in the folders corresponding to all the detected folder names that conform to the second string matching rule.

Wherein, determining a set of files to be processed comprises:

judging whether the number of files in each folder in the electronic device is greater than or equal to a preset first threshold respectively;

if so, determining all the files in that folder as a set of files to be processed.

Wherein, before performing a regular expression identification operation on the obtained string corresponding to the name of each file respectively, the method further comprises:

determining the number N of types of regular expression templates in the regular expression template library that match strings corresponding to the names of files in the set of files to be processed;

performing a regular expression identification operation on the obtained string corresponding to the name of each file respectively, comprises:

when N is less than or equal to a preset second threshold, performing a regular expression identification operation on the obtained string corresponding to the name of each file respectively.

Wherein, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

Wherein, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

In addition, an embodiment of the present application further provides an executable code for executing the method for file name identification provided by the embodiment of the present application, wherein, the method for file name identification provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template.

Wherein, determining a set of files to be processed comprises:

determining all the files in each folder in the electronic device as a set of files to be processed.

Wherein, determining a set of files to be processed comprises:

detecting whether the name of each folder in the electronic device conforms to a preset first string matching rule respectively;

determining, as a set of files to be processed, all the files in the folder corresponding to the detected folder name that conforms to the first string matching rule.

Wherein, determining a set of files to be processed comprises:

detecting whether the name of each folder in the electronic device conforms to a preset second string matching rule respectively;

determining, as a set of files to be processed, all the files in the folders corresponding to all the detected folder names that conform to the second string matching rule.

Wherein, determining a set of files to be processed comprises:

judging whether the number of files in each folder in the electronic device is greater than or equal to a preset first threshold respectively;

if so, determining all the files in that folder as a set of files to be processed.

Wherein, before performing a regular expression identification operation on the obtained string corresponding to the name of each file respectively, the method further comprises:

determining the number N of types of regular expression templates in the regular expression template library that match strings corresponding to the names of files in the set of files to be processed;

performing a regular expression identification operation on the obtained string corresponding to the name of each file respectively, comprises:

when N is less than or equal to a preset second threshold, performing a regular expression identification operation on the obtained string corresponding to the name of each file respectively.

Wherein, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

Wherein, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

In addition, the embodiment of the present application further provides an electronic device, comprising: a processor, a memory, a communication interface and a bus;

the processor, the memory and the communication interface being connected and communicated with each other via the bus;

the memory storing an executable code;

the processor running a program corresponding to the executable code by reading the executable code stored in the memory for executing the method for file cleaning provided by the embodiment of the present application, wherein, the method for file cleaning provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template;

matching the identified regular expression with a regular expression in a preset regular expression library for file cleaning;

deleting the file corresponding to the matched regular expression.

In addition, an embodiment of the present application further provides a storage medium for storing an executable code for executing the method for file cleaning provided by the embodiment of the present application, wherein, the method for file cleaning provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template;

matching the identified regular expression with a regular expression in a preset regular expression library for file cleaning;

deleting the file corresponding to the matched regular expression.

In addition, an embodiment of the present application further provides an executable code for executing the method for file cleaning provided by the embodiment of the present application, wherein, the method for file cleaning provided by the embodiment of the present application may comprise:

determining a set of files to be processed which includes at least one file;

obtaining a string corresponding to the name of each file included in the set of files to be processed;

performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string;

identifying a regular expression of the file name corresponding to the string according to the determined regular expression template;

matching the identified regular expression with a regular expression in a preset regular expression library for file cleaning;

deleting the file corresponding to the matched regular expression.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

All embodiments in the description are described in a correlated manner, and identical or similar parts in various embodiments can be referred to one another, the description for each embodiment all focuses on the differences with other embodiments. Especially, the embodiments of a device are briefly described and reference can be made to the description of the embodiments of a method for its related contents since the embodiments of the device are substantially similar to those of the method.

It will be understood by those of ordinary skill in the art that all or some of the steps in the method described above may be accomplished by a program to instruct the associated hardware. Said program may be stored in a computer-readable storage medium, such as ROM/RAM, magnetic disks, optical disks, etc.

Embodiments described above are just preferred embodiments of the present invention, and not intended to limit the scope of the present invention. Any modifications, equivalent, improvement or the like within the spirit and principle of the present invention should be included in the scope of the present invention.

What is claimed is:

1. A method for file name identification, applicable to an electronic device, wherein the method comprises:

determining a set of files to be processed which includes at least one file;

obtaining a string corresponding to the name of each file included in the set of files to be processed;

wherein, determining the set of files to be processed comprises:

detecting whether the name of each folder in the electronic device conforms to a preset first string matching rule respectively, and judging whether the number of files in each folder in the electronic device is greater than or equal to a preset first threshold respectively;

determining, as the set of files to be processed, all the files in the folder corresponding to the detected folder name that conforms to the first string matching rule, and all the files in the folder in which the number of the files is greater than or equal to a preset first threshold;

determining a number N of types of regular expression templates in the regular expression template library that match strings corresponding to the names of files in the set of files to be processed;

when N is less than or equal to a preset second threshold, performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string; and identifying a regular expression of the file name corresponding to the string according to the determined regular expression template.

2. The method of claim 1, wherein, determining the set of files to be processed comprises:

determining all the files in each folder in the electronic device as the set of files to be processed.

3. The method of claim 1, wherein, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

4. The method of claim 1, wherein, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

5. A method for file name identification, applicable to an electronic device, wherein the method comprises:

determining a set of files to be processed which includes at least one file;

obtaining a string corresponding to the name of each file included in the set of files to be processed;

wherein, determining the set of files to be processed comprises:

detecting whether the name of each folder in the electronic device conforms to a preset second string matching rule respectively, and judging whether the number of files in each folder in the electronic device is greater than or equal to a preset first threshold respectively;

determining, as the set of files to be processed, all the files in the folders corresponding to all the detected folder names that conform to the second string matching rule, and all the files in the folder in which the number of the files is greater than or equal to a preset first threshold;

determining a number N of types of regular expression templates in the regular expression template library that match strings corresponding to the names of files in the set of files to be processed;

when N is less than or equal to a preset second threshold, performing a regular expression identification operation on the obtained string corresponding to the name of each file respectively, wherein the regular expression identification operation comprises:

detecting whether a regular expression template matching the string is present in a preset regular expression template library which includes at least one regular expression template;

if so, determining the detected regular expression template as a regular expression template of the file name corresponding to the string; and identifying a regular expression of the file name corresponding to the string according to the determined regular expression template.

6. The method of claim 5, wherein, determining the set of files to be processed comprises:

determining all the files in each folder in the electronic device as the set of files to be processed.

7. The method of claim 5, wherein, when N is less than or equal to the preset second threshold, before performing a regular expression identification operation on the obtained string corresponding to the name of each file respectively, the method further comprises:

detecting whether the number of strings which correspond to the names of files included in the set of files to be processed and match any type of regular expression template among N types of regular expression templates is greater than or equal to a preset third threshold;

when N is less than or equal to a preset second threshold, performing a regular expression identification operation on the obtained string corresponding to the name of each file respectively, comprises:

when N is less than or equal to the preset second threshold, and it is detected that the number of strings which correspond to the names of files included in the set of files to be processed and match any type of regular expression template among the N types of regular expression templates is greater than or equal to the preset third threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset fourth threshold;

if so, determining the detected regular expression template as a regular expression template of the file name corresponding to the string.

8. The method of claim 5, wherein, before performing a regular expression identification operation on the obtained string corresponding to the name of each file respectively, the method further comprises:

detecting whether the number of strings which correspond to the names of files included in the set of files to be processed and match any one of regular expression templates in the regular expression template library is greater than or equal to a preset fifth threshold;

performing a regular expression identification operation on the obtained string corresponding to the name of each file respectively, comprises:

when it is detected that the number of strings which correspond to the names of files included in the set of files to be processed and match any one of regular expression templates in the regular expression template library is greater than or equal to the preset fifth threshold, performing a regular expression identification operation on the obtained string corresponding to the name of each file respectively;

determining the detected regular expression template as a regular expression template of the file name corresponding to the string, comprises:

judging whether the number of strings which correspond to the names of files included in the set of files to be processed and match the detected regular expression template is greater than or equal to a preset sixth threshold;

if so, determining the detected regular expression template as a regular expression template of the file name corresponding to the string.

9. A method for file cleaning, applicable to an electronic device, wherein the method comprises:
   determining a set of files to be processed which includes at least one file;
   obtaining a string corresponding to the name of each file included in the set of files to be processed;
   wherein, determining the set of files to be processed comprises:
      detecting whether the name of each folder in the electronic device conforms to a preset first string matching rule respectively, and judging whether the number of files in each folder in the electronic device is greater than or equal to a preset first threshold respectively;
      determining, as the set of files to be processed, all the files in the folder corresponding to the detected folder name that conforms to the first string matching rule, and all the files in the folder in which the number of the files is greater than or equal to a preset first threshold;
   determining a number N of types of regular expression templates in the regular expression template library that match strings corresponding to the names of files in the set of files to be processed;
   when N is less than or equal to a preset second threshold, performing a regular expression identification operation on the obtained string corresponding to the name of each file respectively, wherein the regular expression identification operation comprises:
   detecting whether a regular expression template matching the string is present in a preset regular expression template library which includes at least one regular expression template;
   if so, determining the detected regular expression template as a regular expression template of the file name corresponding to the string;
   identifying a regular expression of the file name corresponding to the string according to the determined regular expression template;
   matching the identified regular expression with a regular expression in a preset regular expression library for file cleaning; and
   deleting the file corresponding to the matched regular expression.

10. A method for file cleaning, applicable to an electronic device, wherein the method comprises:
   determining a set of files to be processed which includes at least one file;
   obtaining a string corresponding to the name of each file included in the set of files to be processed;
   wherein, determining the set of files to be processed comprises:
      detecting whether the name of each folder in the electronic device conforms to a preset second string matching rule respectively, and judging whether the number of files in each folder in the electronic device is greater than or equal to a preset first threshold respectively;
      determining, as the set of files to be processed, all the files in the folders corresponding to all the detected folder names that conform to the second string matching rule, and all the files in the folder in which the number of the files is greater than or equal to a preset first threshold;
   determining a number N of types of regular expression templates in the regular expression template library that match strings corresponding to the names of files in the set of files to be processed;
   when N is less than or equal to a preset second threshold, performing a regular expression identification operation on the obtained string corresponding to the name of each file respectively, wherein the regular expression identification operation comprises:
   detecting whether a regular expression template matching the string is present in a preset regular expression template library which includes at least one regular expression template;
   if so, determining the detected regular expression template as a regular expression template of the file name corresponding to the string;
   identifying a regular expression of the file name corresponding to the string according to the determined regular expression template;
   matching the identified regular expression with a regular expression in a preset regular expression library for file cleaning; and
   deleting the file corresponding to the matched regular expression.

* * * * *